United States Patent [19]
Ploeger et al.

[11] Patent Number: 5,455,996
[45] Date of Patent: Oct. 10, 1995

[54] BRAKE SPRING ROLL

[75] Inventors: Randall J. Ploeger, Clarinda, Iowa; Larry Morgan, Sherwood Park, Canada

[73] Assignee: Lisle Corporation, Clarinda, Iowa

[21] Appl. No.: 191,615

[22] Filed: Feb. 4, 1994

Related U.S. Application Data

[62] Division of Ser. No. 997,594, Dec. 28, 1992, abandoned.

[51] Int. Cl.[6] ..................................................... B23F 6/00
[52] U.S. Cl. ................. 29/402.08; 29/426.6; 29/227; 29/450; 269/6
[58] Field of Search .................. 29/402.08, 426.6, 29/426.5, 426.1, 450, 227, 256–259, 270, 283, 436; 269/6; 81/175, 176; 140/123, 102.5; 294/119.1; 219/142–144

[56] References Cited

U.S. PATENT DOCUMENTS

| | | |
|---|---|---|
| 1,211,009 | 1/1917 | Thornton . |
| 1,293,538 | 2/1919 | Pierce . |
| 1,503,541 | 8/1924 | Lintott et al. . |
| 1,705,884 | 3/1929 | Wells . |
| 1,931,250 | 10/1933 | Campbell . |
| 2,042,287 | 5/1936 | Allievi et al. . |
| 2,748,640 | 6/1956 | Alexander . |
| 4,691,428 | 9/1987 | Engstrom .................. 29/426.6 |
| 4,870,737 | 10/1989 | Navarro . |
| 5,095,603 | 3/1992 | Carruthers et al. . |
| 5,345,664 | 9/1994 | McMahon et al. ............ 29/402.08 |
| 5,371,936 | 12/1994 | Blanchard ..................... 29/227 |

OTHER PUBLICATIONS

K–D Tools Catalog, Brake & Wheel Tools Brake, Part No. 298, Brake Spring Pliers.
K–D Tools Catalog, Part No. 3351, Brake Shoe Hold–Down Clip Pliers.

*Primary Examiner*—Robert C. Watson
*Attorney, Agent, or Firm*—Banner & Allegretti, Ltd.

[57] ABSTRACT

A method of using a brake spring tool which includes a shaft cooperative with a slotted collar. The slot may be fitted over the lead wire of the spring and the shaft tightly engaged against the lead wire to facilitate installation or removal.

1 Claim, 2 Drawing Sheets

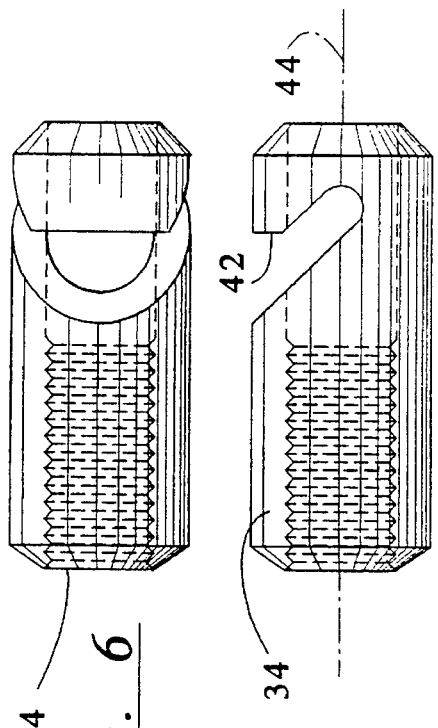
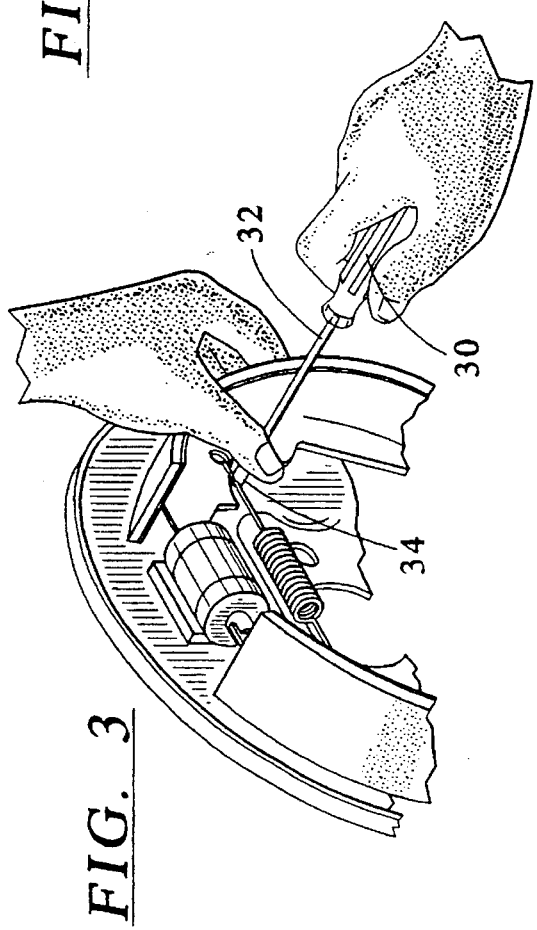
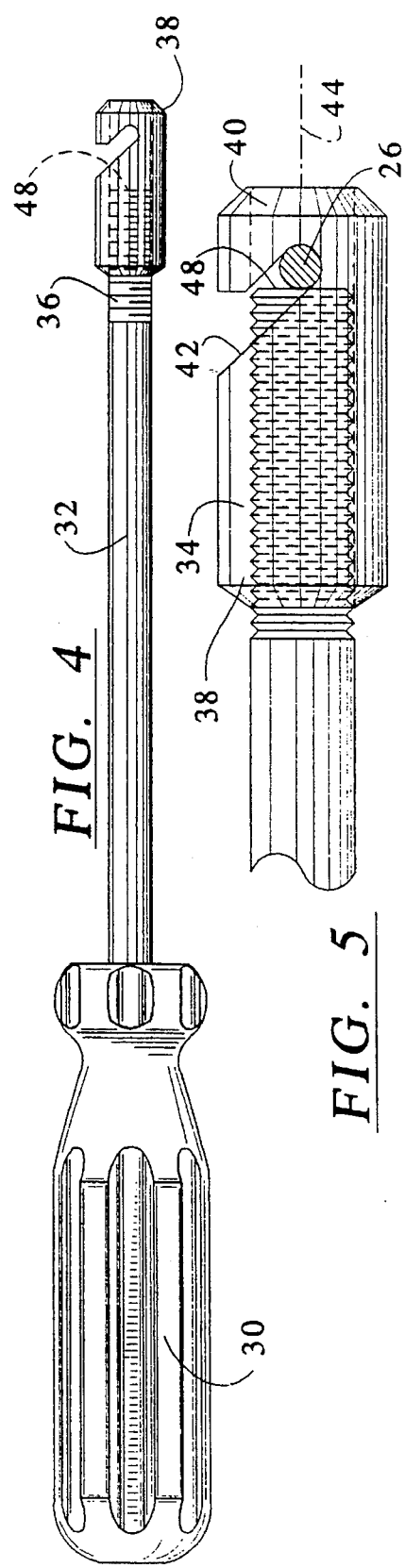

BRAKE SPRING ROLL

This is a divisional of application Ser. No. 07/997,594, filed Dec. 28, 1992, now abandoned.

BACKGROUND OF THE INVENTION

This is invention relates to a tool useful for the repair of brakes on automobiles, and more particularly, to a tool which is useful for installing or releasing a brake spring from a drum brake assembly.

Many motor vehicles utilize drum brakes. Typically drum brakes include a pair of opposed, arcuate brake shoes pivotally mounted at one end on a brake shoe plate affixed to the vehicle axle. The shoes are coupled with a piston which causes them to move outwardly or spread against the walls of a cylindrical drum attached to a wheel on the axle and thereby effect a brake action. The brake shoes are also biased against the force of the piston toward one another by springs which connect the spaced shoes. Usually, a brake spring includes a center coil spring with lead wires projecting from each end and terminating with a hook end that fits in openings in the brake shoe. One or more such brake springs may be prodded for each drum brake assembly.

When repairing a drum brake assembly, a mechanic may be required to remove the brake springs. Heretofore, removal of a brake spring was effected by grasping the spring with a channel lock or pliers or some other similar tool and effecting removal of the spring by manipulation of the tool. Such tools and the methods of utilization of such tools has not been entirely satisfactory. Consequently, auto mechanics have indicated the need for a special tool useful for removal or installation of brake springs of drum brake assemblies. That need has resulted in the development of the present invention.

SUMMARY OF THE INVENTION

In a principal aspect, the present invention comprises a tool which includes a handle having a shaft extending axially therefrom. The end of the shaft is threaded to receive a cylindrical collar with a slot partially extending therethrough configured to receive the lead wire of a brake spring. The tool shaft may then be rotated to tightly engage or grip the lead wire in the slot and manually manipulated to release the spring or replace the spring in engagement with a brake shoe.

Thus it is an object of the invention to provide an improved tool for installation or removal of a brake spring from a drum brake assembly.

It is a further object of the invention to provide an improved brake spring tool which is inexpensive, rugged and easy to manipulate manually.

Yet a further object of the invention is to provide an improved brake spring tool which may be utilized for both installation as well as removal of a brake spring from a drum brake assembly.

Another object of the invention is to provide a brake spring tool which may be utilized for manipulation of wire associated with a spring or with any other mechanical element or device.

These and other objects, advantages and features of the invention will be set forth in the detailed description which follows.

BRIEF DESCRIPTION OF THE DRAWING

In the detailed description which follows reference will be made to the drawing comprised of the following figures:

FIG. 3 is a perspective view illustrating the use of the brake spring tool of the invention;

FIG. 4 is a plan view of the brake spring tool of the invention;

FIG. 5 is an enlarged plan view of tip of the brake spring tool of the invention positioned to tightly retain a lead wire of a spring;

FIG. 6 is an enlarged top plan view of the construction of the tip; and

FIG. 7 is an enlarged side elevation of the tip of FIG. 6.

DESCRIPTION OF THE PREFERRED EMBODIMENT

Figure 1:
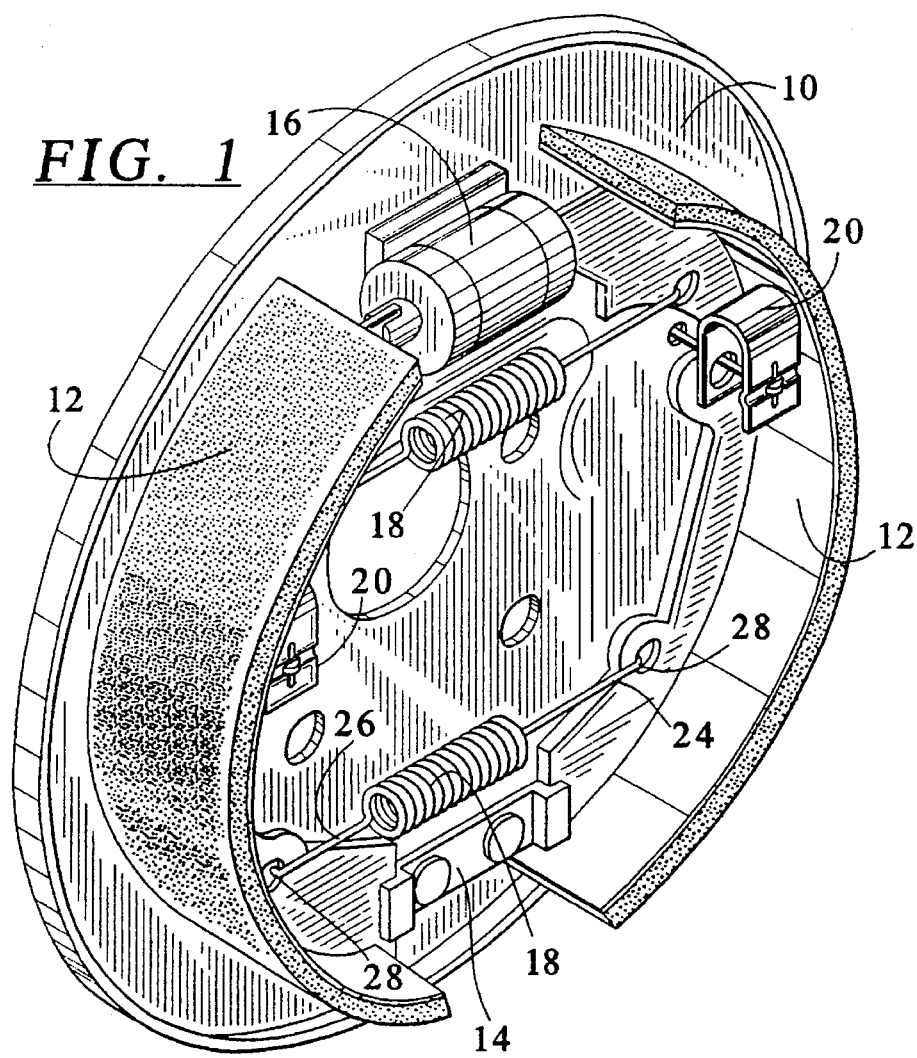
FIG. 1 is a perspective view of a typical drum brake assembly which includes a pair of brake springs of the type that can be installed or removed and manipulated by means of the improved tool of the present invention.

FIG. 1 depicts a typical drum brake assembly. The assembly includes a backing plate 10 with opposed drum members 12 removably mounted thereon. The drum members 12 are generally semi-cylindrical. Each member 12 is pivotally mounted at one end on a bracket or pivot member 14. An expansion piston 15 engages the opposite end of each drum member 12. During the braking operation, the expansion cylinder 16 drives the opposite end of each drum member 12 and thereby forces the drum members 12 outwardly or away from one another in a pivoting motion about the pivot member 14. This causes the drum members 12 to frictionally engage against a brake drum (not shown) associated with a turning wheel of the vehicle thereby braking the vehicle. Brake springs 18 engage with the drum members 12 and bias those drum members 12 toward one another. A pin and clip arrangement 20 is utilized to retain the drum members 12 on the backing plate 10.

The present invention relates to a tool which is useful for installation or removal of the brake springs 18. It should be noted that the typical brake spring 18 is comprised of a center coil 22, oppositely extending end lead wires 24 and 26, and a hook 28 at each end. The hooks 28 engage with appropriate openings in the respective brake shoes 12.

Figure 2:
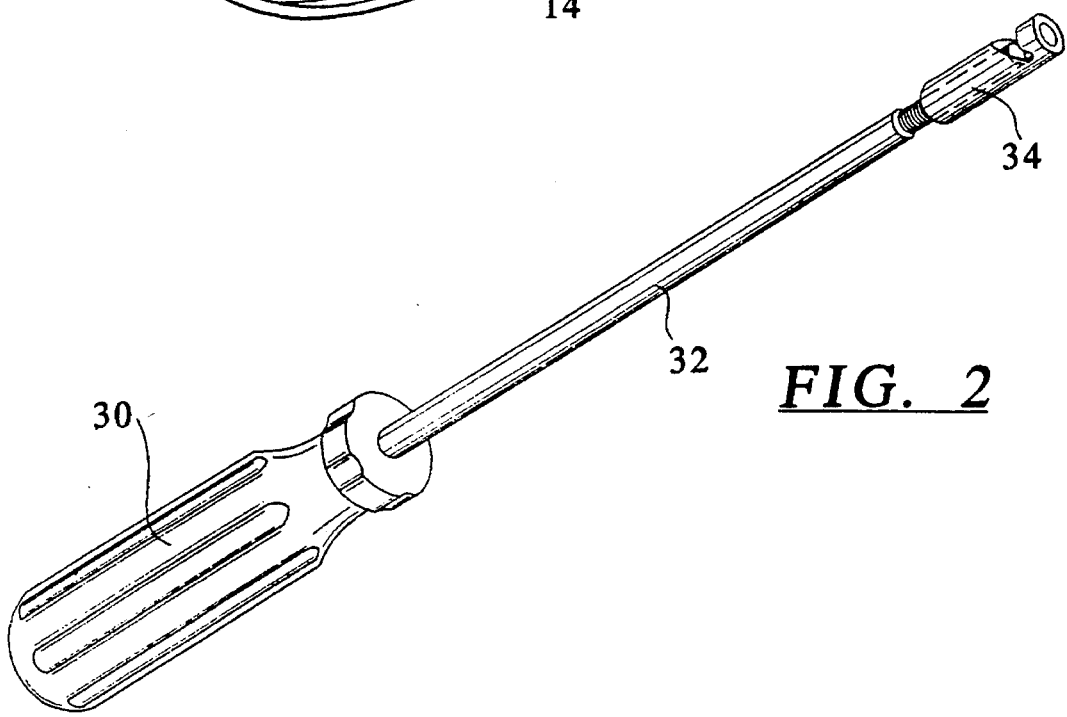
FIG. 2 is a perspective view of the improved brake spring tool of the invention.

FIG. 2 illustrates in greater detail the brake spring tool. The tool is designed to cooperatively engage one lead wire 24 and/or 26. The tool, as depicted in FIG. 2, includes a handle 30, an axially extending shaft 32, and a collar 34. The shaft 32 is a steel rod which includes a distal end 36 shown in FIG. 4 which is threaded. The collar 34, as illustrated in FIGS. 5, 6 and 7, is a hollow cylindrical member which is threaded at an inner end 38. The outer end 40 of collar 34 does not need to be threaded, though it may be. Most importantly, the collar 34 includes a slot 42 which extends at an acute angle with respect to an axis 44 of the collar 34. The slot 42 extends preferably at an angle of about 45° with respect to the axis 44 and is cut inwardly through the collar 34 for a distance slightly beyond the center line axis 44.

FIG. 3 depicts the manner of use of the brake spring tool. That is, the handle 30 and shaft 32 are rotated or "unthreaded" from the collar 34 to expose or open the slot 42. The slot 42 is then fitted over a lead wire 24 or 26. The handle 30 and shaft 32 are then rotated or threaded in the opposite direction to tighten the end of the shaft 32, namely the end 48 as shown in FIG. 4 and FIG. 5, tightly against lead wire 26. This retains the lead wire 26 in the slot 42 and precludes movement thereof. The mechanic or auto repair person may then place his hand or thumb against the shaft 32 to move or twist the lead wire 26 and spring 18 in a manner which will remove the hooked end 28 from the opening associated with the brake drum 12. Manual manipulation effects both removal of the brake spring 18 or installation of the brake spring 18. After the brake spring 18 is removed or manipulated in the manner described, the handle 30 and shaft 32 may again be rotated relative to the collar 34 to release the lead wire 26.

With the tool of the present invention, it is possible to engage and manipulate a lead wire or wire associated with many mechanisms, including drum brakes. It is also possible to vary the construction of the tool depicted and described above. For example, handle 32 may be constructed to conform to the shape of the operators hand. Multiple slots, such as slot 42, may be provided in the collar gauged to the size of the wire which is to be manipulated or engaged. The collar 34 may have a different configuration. The shape and extent of the slot 42 may be altered. Thus, there are variants of the invention described and the scope and meaning of the invention is to be limited only by the following claims and their equivalents.

What is claimed is:

1. A method for installation or removal of a brake spring having a spring lead wire from a drum brake assembly using a tool having a handle, an axial shaft with a threaded end, a threaded cylindrical collar on the end with a slot partially through the collar for receipt of a spring lead wire comprising the steps of:

(a) positioning the collar on the tool shaft to fully expose the slot in an open position;

(b) inserting the slot over the lead wire;

(c) rotating the shaft in the collar to tightly engage the lead wire in the slot and effectively preclude movement of the lead wire in the slot;

(d) manipulating the shaft and the retained lead wire to remove or install an end of the wire; and (e) removing the tool from the lead wire by reversibly rotating the shaft and releasing the lead wire.

* * * * *